(12) United States Patent
Kropp et al.

(10) Patent No.: US 11,584,823 B2
(45) Date of Patent: Feb. 21, 2023

(54) EPOXY STABILIZATION USING SUBSTITUTED BARBITURIC ACIDS

(71) Applicant: 3M INNOVATIVE PROPERTIES COMPANY, St. Paul, MN (US)

(72) Inventors: Michael A. Kropp, Cottage Grove, MN (US); Matthew J. Kryger, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 504 days.

(21) Appl. No.: 16/467,570

(22) PCT Filed: Dec. 5, 2017

(86) PCT No.: PCT/IB2017/057663
§ 371 (c)(1),
(2) Date: Jun. 7, 2019

(87) PCT Pub. No.: WO2018/109617
PCT Pub. Date: Jun. 21, 2018

(65) Prior Publication Data
US 2021/0403634 A1    Dec. 30, 2021

Related U.S. Application Data

(60) Provisional application No. 62/433,325, filed on Dec. 13, 2016.

(51) Int. Cl.
C08G 59/24    (2006.01)
C08G 59/66    (2006.01)
C08G 59/68    (2006.01)

(52) U.S. Cl.
CPC ........... *C08G 59/245* (2013.01); *C08G 59/66* (2013.01); *C08G 59/686* (2013.01)

(58) Field of Classification Search
CPC ..... C08G 59/245; C08G 59/66; C08G 59/686
USPC ........................................................ 528/94
See application file for complete search history.

(56) References Cited

U.S. PATENT DOCUMENTS

| | | | |
|---|---|---|---|
| 3,496,250 A | 2/1970 | Czerwinski |
| 3,597,410 A | 8/1971 | Lieske |
| 4,546,155 A | 10/1985 | Hirose |
| 5,077,376 A | 12/1991 | Dooley |
| 5,430,112 A | 7/1995 | Sakata |
| 5,439,746 A | 8/1995 | Suzuki |
| 5,464,910 A | 11/1995 | Nakatsuka |
| 6,359,039 B1 | 3/2002 | Chen |
| 6,432,613 B1 | 8/2002 | Chen |
| 6,653,371 B1 | 11/2003 | Burns |
| 6,872,762 B2 | 3/2005 | Burns |
| 8,084,519 B2 | 12/2011 | Okuno |
| 10,711,116 B2 | 7/2020 | Grun |
| 2013/0143176 A1 | 6/2013 | Thalacker |
| 2013/0165600 A1 | 6/2013 | Chen |
| 2013/0313693 A1 | 11/2013 | Burns |

FOREIGN PATENT DOCUMENTS

| | | |
|---|---|---|
| CN | 101210077 | 7/2008 |
| EP | 0138465 | 4/1985 |
| EP | 0193068 | 9/1986 |
| EP | 0257640 | 3/1988 |
| EP | 0594133 | 4/1994 |
| EP | 0659793 | 6/1995 |
| EP | 1291390 | 3/2003 |
| GB | 1121196 | 7/1968 |
| JP | S56-057820 | 5/1981 |
| JP | S61-159417 | 7/1986 |
| JP | 63-218752 | 9/1988 |
| WO | WO 2000-230112 | 8/2000 |
| WO | WO 2005/070991 | 8/2005 |
| WO | WO 2006-083344 | 8/2006 |
| WO | WO 2010-052823 | 5/2010 |
| WO | WO 2012-059558 | 5/2012 |
| WO | WO 2012-093510 | 7/2012 |
| WO | WO 2015-141347 | 9/2015 |
| WO | WO 2016-130673 | 8/2016 |

OTHER PUBLICATIONS

International Search Report for PCT International Application No. PCT/IB2017/057663, dated Feb. 21, 2018, 5 pages.

*Primary Examiner* — David T Karst
(74) *Attorney, Agent, or Firm* — Kathleen B. Gross; Steven A. Bem

(57) ABSTRACT

A curable, one-part epoxy/thiol resin composition comprising: an epoxy resin component comprising an epoxy resin having at least two epoxide groups per molecule; a thiol component comprising a polythiol compound having at least two primary thiol groups; a nitrogen-containing catalyst for the epoxy resin; and a substituted barbituric acid soluble in the one-part epoxy/thiol resin composition.

20 Claims, No Drawings

EPOXY STABILIZATION USING SUBSTITUTED BARBITURIC ACIDS

CROSS REFERENCE TO RELATED APPLICATIONS

This application is a national stage filing under 35 U.S.C. 371 of PCT/IB2017/057663, filed Dec. 5, 2017, which claims the benefit of U.S. Provisional Application No. 62/433,325, filed Dec. 12, 2016, the disclosure of which is incorporated by reference in its entirety herein.

BACKGROUND

Curable epoxy-based compositions are well known. Such compositions are used as adhesives, coating agents, sealing agents, and casting agents. Epoxy-based compositions are also used in the electronics industry, e.g., for cell phone assembly. Epoxy/polythiol-containing compositions conventionally have been used as two-part compositions. This was due at least in part to the instability of a one-part composition that includes an epoxy resin, a polythiol curing agent, and a liquid (soluble) tertiary amine catalyst. Such one-part compositions in which the epoxy resin, polythiol, and the catalyst are admixed at room temperature typically have working or "pot" lives on the order of minutes to a few hours. These properties impose practical restrictions on end-use applications of such compositions. Accordingly, many traditional epoxy/polythiol compositions have been formulated as two-part compositions.

Commercially available latent curing agents used in one-part epoxy resin adhesive formulations ordinarily provide such formulations with a combination of good storage stability and moderate reactivity at elevated temperatures. Examples of such commercially available latent curing agents include dicyandiamide and dibasic acid dihydrazide. These curing agents are useful in formulating epoxy resin compositions with excellent storage stability; however, to achieve cure, these curing agents ordinarily require heating to temperatures greater than 150° C. for extended periods of time.

In the electronics industry, it is desirable to provide epoxy-based compositions with thermal cure profiles tailored to specific application temperature requirements. Such cure profile tailoring assists in maintaining the integrity of the electronic components during the bonding process in, e.g., cell phone assembly. In addition, it is desirable for such compositions to have extended room temperature pot lives so that the composition may be applied to a larger number of parts over an extended period of time. This prolongs the useable application life of the compositions, thereby ensuring reproducible dispensing properties.

Advances in the electronics industry have made precise deposition of assembly adhesives a critical processing parameter, particularly in view of high throughput demand and process efficiency. The increasingly popular smaller-sized microelectronic components has made precise deposition of solder or adhesives for device assembly that much more important. Where precise adhesive deposition does not occur—either due to adhesive deposition technique imprecision, or spreading of the adhesive due to inappropriate rheological properties for the particular application, or both—surface mounting of components may not occur at all, and even when mounting does occur, the mounting may not occur in a commercially acceptable manner.

Heretofore, the desirability of balancing reactivity with pot life in curable one-part epoxy-based compositions has been recognized. Notwithstanding the state of the art, it is desirable to provide epoxy compositions with improved storage stability at room temperature, particularly with respect to viscosity maintenance over time, as well as with extended working lives at room temperature and relatively short curing times at elevated temperatures.

SUMMARY

The present disclosure provides a curable epoxy/thiol resin composition that includes: an epoxy resin component including an epoxy resin having at least two epoxide groups per molecule; a thiol component including a polythiol compound having at least two primary thiol groups; a nitrogen-containing catalyst for the epoxy resin; and a substituted barbituric acid soluble in the one-part epoxy/thiol resin composition. This is a "one-part" composition that includes the thiol curing agent, the nitrogen-containing catalyst, and the epoxy resin in admixture.

Also provided is a method of curing a curable, one-part epoxy/thiol resin composition. The method includes: providing a curable, one-part epoxy/thiol resin composition as described herein; and heating the curable, one-part epoxy/thiol resin composition to a temperature of at least 50° C. In certain embodiments, the curable, one-part epoxy/thiol resin composition is heated to a temperature of up to 80° C. In certain embodiments, the curable, one-part epoxy/thiol resin composition is heated to a temperature of 60-65° C.

The term "aliphatic" refers to C1-C40, suitably C1-C30, straight or branched chain alkenyl, alkyl, or alkynyl which may or may not be interrupted or substituted by one or more heteroatoms such as O, N, or S.

The term "cycloaliphatic" refers to cyclized aliphatic C3-C30, suitably C3-C20, groups and includes those interrupted by one or more heteroatoms such as O, N, or S.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, and 1,4-cyclohexyldimethylene.

The term "aromatic" refers to C3-C40, suitably C3-C30, aromatic groups including both carboxyclic aromatic groups as well as heterocyclic aromatic groups containing one or more of the heteroatoms, O, N, or S, and fused ring systems containing one or more of these aromatic groups fused together.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Optionally, the aromatic ring can have one or more additional carbocyclic rings that are fused to the aromatic ring. Any additional rings can be unsaturated, partially saturated, or saturated. Unless otherwise specified, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 22° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

The present disclosure provides a curable, one-part epoxy/thiol resin composition that includes: an epoxy resin component including an epoxy resin having at least two epoxide groups per molecule; a thiol component including a polythiol compound having at least two primary thiol groups; a nitrogen-containing catalyst for the epoxy resin; and a substituted barbituric acid soluble in the one-part epoxy/thiol resin composition. In this context "one-part" means that all components, including the thiol curing agent, the nitrogen-containing catalyst, and any optional additives are admixed with the epoxy resin.

The curable epoxy/thiol resin compositions of the present disclosure show improved storage stability at room temperature, particularly with respect to viscosity maintenance over time, as well as with extended working lives at room temperature, and relatively short curing times at elevated temperatures. In certain embodiments, the curable epoxy/thiol resin compositions are stable at room temperature for a period of at least 2 weeks, at least 4 weeks, or at least 2 months. In this context, "stable" means that the epoxy/thiol composition remains in a curable form.

It is believed a barbituric acid derivative prevents the nitrogen-containing catalyst and thiol curing agent from curing the epoxy resin for a period of time (e.g., at least 2 weeks) because the weakly acidic barbituric acid neutralizes any prematurely dissolved nitrogen-containing catalyst.

The curable epoxy/thiol resin compositions also possess good low temperature curability. In certain embodiments, the curable epoxy/thiol resin composition is curable at a temperature of at least 50° C. In certain embodiments, the curable epoxy/thiol resin composition is curable at a temperature of up to 80° C. In certain embodiments, the curable epoxy/thiol composition is curable at a temperature of 60-65° C.

Thus, curable epoxy/thiol resin compositions of the present disclosure are suitable for use in temperature sensitive bonding applications, particularly in the electronics industry, e.g., in cell phone assembly and bonding of plastic and metal parts. They may also be used in a variety of other applications, such as in the automotive and aerospace industries for parts bonding.

The curable epoxy/thiol resin compositions of the present disclosure may be produced by admixing the substituted barbituric acid derivative, the nitrogen-containing catalyst, the epoxy, the polythiol, and optionally any fillers, thixotropic agents, diluents, adhesion promoters, and the like. Desirably, the soluble barbituric acid derivatives should be added to the composition prior to the addition of the nitrogen-containing catalyst.

Epoxy Resin Component

The epoxy resin component included in the curable epoxy/polythiol resin composition contains an epoxy resin that has at least two epoxy functional groups (i.e., oxirane groups) per molecule. As used herein, the term oxirane group refers to the following divalent group.

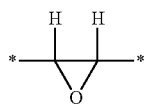

The asterisks denote a site of attachment of the oxirane group to another group. If an oxirane group is at the terminal position of the epoxy resin, the oxirane group is typically bonded to a hydrogen atom.

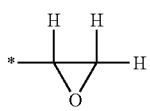

This terminal oxirane group is often part of a glycidyl group.

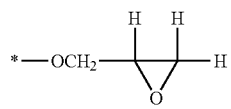

The epoxy resin includes a resin with at least two oxirane groups per molecule. For example, an epoxy compound can have 2 to 10, 2 to 6, or 2 to 4 oxirane groups per molecule. The oxirane groups are usually part of a glycidyl group.

Epoxy resins can include a single material or mixture of materials (e.g., monomeric, oligomeric, or polymeric compounds) selected to provide the desired viscosity characteristics before curing and to provide the desired mechanical properties after curing. If the epoxy resin includes a mixture of materials, at least one of the epoxy resins in the mixture is usually selected to have at least two oxirane groups per molecule. For example, a first epoxy resin in the mixture can have two to four or more oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin that is not an oxirane group (i.e., an epoxy resin compound minus the oxirane groups) can be aromatic, aliphatic, or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, thio groups such as in a thio ether linkage group, carbonyl groups, carbonyloxy groups, carbonylimino groups, phosphono groups, sulfono groups, nitro groups, nitrile groups, and the like. The epoxy resin can also be a silicone-based material such as a polydiorganosiloxane-based material.

Although the epoxy resin can have any suitable molecular weight, the weight average molecular weight is usually at least 100 grams/mole, at least 150 grams/mole, at least 175 grams/mole, at least 200 grams/mole, at least 250 grams/mole, or at least 300 grams/mole. The weight average molecular weight can be up to 50,000 grams/mole or even higher for polymeric epoxy resins. The weight average molecular weight is often up to 40,000 grams/mole, up to 20,000 grams/mole, up to 10,000 grams/mole, up to 5,000 grams/mole, up to 3,000 grams/mole, or up to 1,000 grams/mole. For example, the weight average molecular weight can be in the range of 100 to 50,000 grams/mole, in the range of 100 to 20,000 grams/mole, in the range of 10 to 10,000 grams/mole, in the range of 100 to 5,000 grams/mole, in the range of 200 to 5,000 grams/mole, in the range of 100 to 2,000 grams/mole, in the range of 200 to 2,000 grams/mole, in the range of 100 to 1,000 grams/mole, or in the range of 200 to 1,000 grams/mole.

Suitable epoxy resins are typically a liquid at room temperature; however, solid epoxy resins that can be dissolved in one of the other components of the composition, such as a liquid epoxy resin, can be used if desired. In most embodiments, the epoxy resin is a glycidyl ether. Exemplary glycidyl ethers can be of Formula (I).

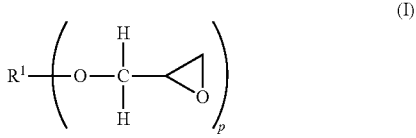
(I)

In Formula (I), group $R^1$ is a polyvalent group that is aromatic, aliphatic, or a combination thereof. Group $R^1$ can be linear, branched, cyclic, or a combination thereof. Group $R^1$ can optionally include halo groups, oxy groups, thio groups, carbonyl groups, carbonyloxy groups, carbonylimino groups, phosphono groups, sulfono groups, nitro groups, nitrile groups, and the like. Although the variable p can be any suitable integer greater than or equal to 2, p is often an integer in the range of 2 to 10, in the range of 2 to 6, or in the range of 2 to 4.

In some embodiments, the epoxy resin is a polyglycidyl ether of a polyhydric phenol, such as polyglycidyl ethers of bisphenol A, bisphenol F, bisphenol AD, catechol, and resorcinol. In some embodiments, the epoxy resin is a reaction product of a polyhydric alcohol with epichlorohydrin. Exemplary polyhydric alcohols include butanediol, polyethylene glycol, and glycerin. In some embodiments, the epoxy resin is an epoxidized (poly)olefinic resin, epoxidized phenolic novolac resin, epoxidized cresol novolac resin, and cycloaliphatic epoxy resin. In some embodiments, the epoxy resin is a glycidyl ether ester, such as that which can be obtained by reacting a hydroxycarboxylic acid with epichlorohydrin, or a polyglycidyl ester, such as that which can be obtained by reacting a polycarboxylic acid with epichlorohydrin. In some embodiments, the epoxy resin is a urethane-modified epoxy resin. Various combinations of two or more epoxy resins can be used if desired.

In some exemplary epoxy resins of Formula (I), the variable p is equal to 2 (i.e., the epoxy resin is a diglycidyl ether) and $R^1$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of an arene compound), or combination thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms with 1 to 10 heteroatoms, 1 to 6 heteroatoms, or 1 to 4 heteroatoms. The heteroatoms in the heteroalkylene can be selected from oxy, thio, or —NH— groups but are often oxy groups. Suitable arylene groups often have 6 to 18 carbon atoms or 6 to 12 carbon atoms. For example, the arylene can be phenylene, fluorenylene, or biphenylene. Group $R^1$ can further optionally include halo groups, oxy groups, thio groups, carbonyl groups, carbonyloxy groups, carbonylimino groups, phosphono groups, sulfono groups, nitro groups, nitrile groups, and the like. The variable p is usually an integer in the range of 2 to 4.

Some epoxy resins of Formula (I) are diglycidyl ethers where $R^1$ includes (a) an arylene group or (b) an arylene group in combination with an alkylene, heteroalkylene, or both. Group $R^1$ can further include optional groups such as halo groups, oxy groups, thio groups, carbonyl groups, carbonyloxy groups, carbonylimino groups, phosphono groups, sulfono groups, nitro groups, nitrile groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, and 9,9-(4-hydroxyphenol)fluorene. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (I) are derived from bisphenol A (i.e., bisphenol A is 4,4'-dihydroxydiphenylmethane). Examples include, but are not limited to, those available under the trade designation EPON (e.g., EPON 1510, EPON 1310, EPON 828, EPON 872, EPON 1001, EPON 1004, and EPON 2004) from Momentive Specialty Chemicals, Inc. (Columbus, Ohio), those available under the trade designation DER (e.g., DER 331, DER 332, DER 336, and DER 439) from Olin Epoxy Co. (St. Louis, Mo.), and those available under the trade designation EPICLON (e.g., EPICLON 850) from Dainippon Ink and Chemicals, Inc. (Parsippany, N.J.). Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Olin Epoxy Co. (St. Louis, Mo.), those available under the trade designation EPICLON (e.g., EPICLON 830) from Dainippon Ink and Chemicals, Inc. (Parsippany, N.J.), and those available under the trade designation ARALDITE (e.g., ARALDITE 281) from Huntsman Corporation (The Woodlands, Tex.).

Other epoxy resins of Formula (I) are diglycidyl ethers of a poly(alkylene oxide) diol. These epoxy resins also can be referred to as diglycidyl ethers of a poly(alkylene glycol) diol. The variable p is equal to 2 and $R^1$ is a heteroalkylene having oxygen heteroatoms. The poly(alkylene glycol) portion can be a copolymer or homopolymer and often includes alkylene units having 1 to 4 carbon atoms. Examples include, but are not limited to, diglycidyl ethers of poly (ethylene oxide) diol, diglycidyl ethers of poly(propylene oxide) diol, and diglycidyl ethers of poly(tetramethylene oxide) diol. Epoxy resins of this type are commercially available from Polysciences, Inc. (Warrington, Pa.) such as those derived from a poly(ethylene oxide) diol or from a poly(propylene oxide) diol having a weight average molecular weight of 400 grams/mole, about 600 grams/mole, or about 1000 grams/mole.

Still other epoxy resins of Formula (I) are diglycidyl ethers of an alkane diol ($R^1$ is an alkylene and the variable p is equal to 2). Examples include a diglycidyl ether of 1,4-dimethanol cyclohexyl, diglycidyl ether of 1,4-butanediol, and a diglycidyl ether of the cycloaliphatic diol formed from a hydrogenated bisphenol A such as those commercially available under the trade designation EPONEX (e.g., EPONEX 1510) from Hexion Specialty Chemicals, Inc. (Columbus, Ohio) and under the trade designation EPALLOY (e.g., EPALLOY 5001) from CVC Thermoset Specialties (Moorestown, N.J.).

For some applications, the epoxy resins chosen for use in the curable coating compositions are novolac epoxy resins, which are glycidyl ethers of phenolic novolac resins. These resins can be prepared, for example, by reaction of phenols with an excess of formaldehyde in the presence of an acidic catalyst to produce the phenolic novolac resin. Novolac epoxy resins are then prepared by reacting the phenolic novolac resin with epichlorihydrin in the presence of sodium hydroxide. The resulting novolac epoxy resins typically have more than two oxirane groups and can be used to produce cured coating compositions with a high crosslinking density. The use of novolac epoxy resins can be particularly desirable in applications where corrosion resistance, water resistance, chemical resistance, or a combination thereof is desired. One such novolac epoxy resin is poly[(phenyl glycidyl ether)-co-formaldehyde]. Other suitable novolac resins are commercially available under the trade designation ARALDITE (e.g., ARALDITE GY289, ARALDITE EPN 1183, ARALDITE EP 1179, ARALDITE EPN 1139, and ARALDITE EPN 1138) from Huntsman Corporation (The Woodlands, Tex.), under the trade designation EPALLOY (e.g., EPALLOY 8230) from CVC Thermoset Specialties (Moorestown, N.J.), and under the trade designation DEN (e.g., DEN 424 and DEN 431) from Olin Epoxy Co. (St. Louis, Mo.).

Yet other epoxy resins include silicone resins with at least two glycidyl groups and flame retardant epoxy resins with at least two glycidyl groups (e.g., a brominated bisphenol-type epoxy resin having at least two glycidyl groups such as that commercially available from Dow Chemical Co. (Midland, Mich.) under the trade designation DER 580).

The epoxy resin component is often a mixture of materials. For example, the epoxy resins can be selected to be a mixture that provides the desired viscosity or flow characteristics prior to curing. For example, within the epoxy resin may be reactive diluents that include monofunctional or certain multifunctional epoxy resins. The reactive diluent should have a viscosity which is lower than that of the epoxy resin having at least two epoxy groups. Ordinarily, the reactive diluent should have a viscosity less than 250 mPa·s (cPs). The reactive diluent tends to lower the viscosity of the epoxy/polythiol resin composition and often has either a branched backbone that is saturated or a cyclic backbone that is saturated or unsaturated. Preferred reactive diluents have only one functional group (i.e., oxirane group) such as various monoglycidyl ethers. Some exemplary monofunctional epoxy resins include, but are not limited to, those with an alkyl group having 6 to 28 carbon atoms, such as (C6-C28)alkyl glycidyl ethers, (C6-C28)fatty acid glycidyl esters, (C6-C28)alkylphenol glycidyl ethers, and combinations thereof. In the event a monofunctional epoxy resin is the reactive diluent, such monofunctional epoxy resin should be employed in an amount of up to 50 parts based on the total of the epoxy resin component.

In some embodiments, the curable epoxy/thiol resin compositions typically include at least 20 weight percent (wt-%), at least 25 wt-%, at least 30 wt-%, at least 35 wt-%, at least 40 wt-%, or at least 45 wt-%, epoxy resin component, based on a total weight of the curable epoxy/thiol resin composition. If lower levels are used, the cured composition may not contain enough polymeric material (e.g., epoxy resin) to provide desired coating characteristics. In some embodiments, the curable epoxy/thiol resin compositions include up to 80 wt-%, up to 75 wt-%, or up to 70 wt-%, epoxy resin component, based on a total weight of the curable epoxy/thiol resin composition.

Thiol Component

A thiol is an organosulfur compound that contains a carbon-bonded sulfhydryl or mercapto (—C—SH) group. Suitable polythiols are selected from a wide variety of compounds that have two or more thiol groups per molecule, and that function as curatives for epoxy resins.

Examples of suitable polythiols include trimethylolpropane tris(beta-mercaptopropionate), trimethylolpropane tris (thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), a (C1-C12)alkyl polythiol (e.g., butane-1,4-dithiol and hexane-1,6-dithiol), a (C6-C12) aromatic polythiol (e.g., p-xylenedithiol and 1,3,5-tris (mercaptomethyl) benzene). Combinations of polythiols can be used if desired.

In some embodiments, the curable epoxy/thiol compositions typically include at least 25 wt-%, at least 30 wt-%, or at least 35 wt-%, thiol component, based on a total weight of the curable epoxy/thiol resin composition. In some embodiments, the curable epoxy/thiol compositions include up to 70 wt-%, up to 65 wt-%, up to 60 wt-%, up to 55 wt-%, up to 50 wt-%, up to 45 wt-%, or up to 40 wt-%, thiol component, based on a total weight of the curable epoxy/thiol resin composition. Various combinations of two or more polythiols can be used if desired.

In some embodiments, the ratio of the epoxy component to the thiol component in the curable epoxy/thiol resin compositions of the present disclosure is from 0.5:1 to 1.5:1, or 0.75:1 to 1.3:1 (epoxy:thiol equivalents).

Systems containing epoxy resins and polythiols suitable for use in the present disclosure are disclosed in U.S. Pat. No. 5,430,112 (Sakata et al.).

Nitrogen-Containing Catalyst

The epoxy/thiol resin compositions of the present disclosure include at least one nitrogen-containing catalyst. Such catalysts are typically of the heat activated class. In certain embodiments, the nitrogen-containing catalyst is capable of activation at temperatures at or above 50° C. to effect the thermal curing of the epoxy resin.

Suitable nitrogen-containing catalysts are typically a solid at room temperature, and not soluble in the other components of the epoxy/thiol resin compositions of the present disclosure. In certain embodiments, the nitrogen-containing catalysts are in particle form having a particle size (i.e., the largest dimension of the particles, such as the diameter of a sphere) of at least 100 micrometers (i.e., microns).

As used herein, the term "nitrogen-containing catalyst" refers to any nitrogen-containing compound that catalyzes the curing of the epoxy resin. The term does not imply or suggest a certain mechanism or reaction for curing. The nitrogen-containing catalyst can directly react with the oxirane ring of the epoxy resin, can catalyze or accelerate the reaction of the polythiol compound with the epoxy resin, or can catalyze or accelerate the self-polymerization of the epoxy resin.

In certain embodiments, the nitrogen-containing catalysts are amine-containing catalysts. Some amine-containing catalysts have at least two groups of formula —NR$^2$H, wherein R$^2$ is selected from hydrogen, alkyl, aryl, alkaryl, or aralkyl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atom such as a phenyl or biphenyl group. Suitable alkylaryl groups can include the same aryl and alkyl groups discussed above.

The nitrogen-containing catalyst minus the at least two amino groups (i.e., the portion of the catalyst that is not an amino group) can be any suitable aromatic group, aliphatic group, or combination thereof.

Exemplary nitrogen-containing catalysts for use herein include a reaction product of phthalic anhydride and an aliphatic polyamine, more particularly a reaction product of approximately equimolar proportions of phthalic acid and diethylamine triamine, as described in British Patent 1,121, 196 (Ciba Geigy AG). A catalyst of this type is available commercially from Ciba Geigy AG under the tradename CIBA HT 9506.

Yet another type of nitrogen-containing catalyst is a reaction product of: (i) a polyfunctional epoxy compound; (ii) an imidazole compound, such as 2-ethyl-4-methylimidazole; and (iii) phthalic anhydride. The polyfunctional epoxy compound may be a compound having two or more epoxy groups in the molecule as described in U.S. Pat. No. 4,546,155 (Hirose et al.). A catalyst of this type is commercially available from Ajinomoto Co. Inc. (Tokyo, Japan) under the tradename AJICURE PN-23, which is believed to be an adduct of EPON 828 (bisphenol type epoxy resin epoxy equivalent 184-194, commercially available from Hexion Specialty Chemicals, Inc. (Columbus, Ohio)), 2-ethyl-4-methylimidazole, and phthalic anhydride.

Other suitable nitrogen-containing catalysts include the reaction product of a compound having one or more isocyanate groups in its molecule with a compound having at least one primary or secondary amino group in its molecule. Additional nitrogen-containing catalysts include 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, or a combination therof, as well as products of triazine with isocyanuric acid, succinohydrazide, adipohydrazide, isophtholohydrazide, o-oxybenzohydrazide, salicylohydrazide, or a combination thereof.

Nitrogen-containing catalysts are commercially available from sources such as Ajinomoto Co. Inc. (Tokyo, Japan) under the tradenames AMICURE MY-24, AMICURE GG-216 and AMICURE ATU CARBAMATE, from Hexion Specialty Chemicals, Inc. (Columbus, Ohio) under the tradename EPIKURE P-101, from T&K Toka (Chikumazawa, Miyoshi-Machi, Iruma-Gun, Saitama, Japan) under the tradenames FXR-1020, FXR-1081, and FXR-1121, from Shikoku (Marugame, Kagawa Prefecture, Japan) under the tradenames CUREDUCT P-2070 and P-2080, from Air Products and Chemicals (Allentown, Pa.) under the tradenames ANCAMINE 2441 and 2442, from AC Catalysts (Linden, N.J.) under the tradenames TECHNICURE LC80 and LC100, and from Asahi Kasei Kogyo, K.K. (Japan) under the tradename NOVACURE HX-372.

Other suitable nitrogen-containing catalysts are those described in U.S. Pat. No. 5,077,376 (Dooley et al.) and U.S. Pat. No. 5,430,112 (Sakata et al.) referred to as "amine adduct latent accelerators." Other exemplary nitrogen-containing catalysts are described, for example, in British Patent 1,121,196 (Ciba Geigy AG), European Patent Application No. 138465A (Ajinomoto Co.), and European Patent Application No. 193068A (Asahi Chemical).

In some embodiments, the curable epoxy/thiol resin compositions typically include at least 1 part, at least 2 parts, at least 3 parts, at least 4 parts, or at least 5 parts, of a nitrogen-containing catalyst, per 100 parts of the epoxy resin component. In some embodiments, the curable epoxy/thiol compositions typically include up to 45 parts, up to 40 parts, up to 35 parts, up to 30 parts, up to 25 parts, or up to 20 parts, of a nitrogen-containing catalyst, per 100 parts of the epoxy resin component. Various combinations of two or more nitrogen-containing catalysts can be used if desired.

Barbituric Acid Derivative

The barbituric acid derivatives useful in the curable epoxy/thiol resin compositions of the present disclosure include those that are soluble in the epoxy/thiol resin compositions of the present disclosure.

In this context, a barbituric acid derivative "soluble in the epoxy/thiol resin composition" (i.e., a "soluble" barbituric acid derivative) refers to a barbituric acid derivative which, when incorporated in an epoxy/thiol resin composition in an amount of 5 wt-%, produces an epoxy/thiol resin composition with at least 80% clarity and/or at least 80% transmission, as evaluated according to the Stabilizer Solubility Test in the Examples Section. In certain embodiments, the clarity of a curable epoxy/thiol resin composition that includes 5 wt-% of a "soluble" barbituric acid derivative is at least 85%, at least 90%, or at least 95%. In certain embodiments, the transmission of a curable epoxy/thiol resin composition that includes 5 wt-% of a "soluble" barbituric acid derivative is at least 85%, or at least 90%.

A soluble barbituric acid derivative is used in an epoxy/thiol resin composition in an amount that allows the epoxy/thiol resin composition to remain curable for at least 72 hours at room temperature such that there is no doubling in viscosity. Typically, this is an amount of at least 0.01 wt-%, based on the total weight of the curable epoxy/thiol resin composition.

The greater the amount of a soluble barbituric acid derivative used in an epoxy/thiol resin composition, generally the longer the shelf life of the curable epoxy/thiol composition. The greater the amount of a soluble barbituric acid derivative used in an epoxy/thiol resin composition, generally the longer the time required to cure and/or the higher the temperature required to cure the curable epoxy/thiol composition. Thus, depending on the use of the curable composition, there is a balance between shelf life and cure time/temperature. Typically, for a reasonable shelf life, cure time, and cure temperature, the amount of soluble barbituric acid derivative used is up to 1 wt-%, or up to 0.5 wt-%.

Herein, the barbituric acid "derivatives" include those barbituric acid compounds substituted at one or more of the 1, 3, and/or 5 N positions, or at the 1 and/or 3 N positions and optionally at the 5 N position, with an aliphatic, cycloaliphatic, or aromatic group. In certain embodiments, the barbituric acid derivatives include those of Formula (II):

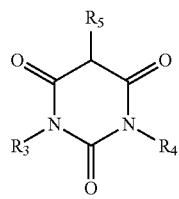

wherein one or more of the $R^3$, $R^4$, and $R^5$ groups are represented by hydrogen, an aliphatic group, a cycloaliphatic group, or an aromatic group (e.g., phenyl), optionally further substituted in any position with one or more of (C1-C4)alkyl, —OH, halide (F, Br, Cl, I), phenyl, (C1-C4)alkylphenyl, (C1-C4)alkenylphenyl, nitro, or —OR$^6$ where $R^6$ is phenyl, a carboxylic group, a carbonyl group, or an aromatic group and $R^6$ is optionally substituted with (C1-C4)alkyl, —OH, or halide; and further wherein at least one of the $R^3$, $R^4$, and $R^5$ groups is not hydrogen. In certain embodiments, at least two of the $R^3$, $R^4$, and $R^5$ groups are not hydrogen.

Such soluble acids function as stabilizers of the nitrogen-containing catalyst in the epoxy/thiol resin compositions of the present disclosure. Desirably, the nitrogen-containing catalyst is stabilized against curing the epoxy resin at room temperature for a period of at least 2 weeks, at least 4 weeks, or at least 2 months.

Examples of suitable substituted barbituric acid derivatives include 1-benzyl-5-phenylbarbituric acid, 1-cyclohexyl-5-ethylbarbituric acid (available from Chemische Fabrik Berg, Bitterfeld-Wolfen, Germany), 1,3-dimethylbarbituric acid (available from Alfa Aesar, Tewksbury, Me.), and combinations thereof.

U.S. Pat. No. 6,653,371 (Burns et al.) teaches that a substantially insoluble solid organic acid is required for epoxy/thiol resin compositions to stabilize the composition. Surprisingly, it was found that the use of a soluble organic acid, in particular, barbituric acid derivatives that are functionalized to make them more soluble, result in better stabilization of the epoxy/thiol resin composition than the use of substantially insoluble organic acids. Also, U.S. Pat. No. 6,653,371 (Burns et al.) teaches that stabilizer effectiveness is directly affected by particle size of the stabilizing component added into the system. A benefit of using soluble barbituric acid derivatives as stabilizers is that the initial particle size does not alter stabilizer performance, at least because the stabilizer is fully dissolved throughout the curable epoxy/thiol resin compositions.

Optional Additives in the Curable Composition

In addition to the epoxy resin component, the thiol component, and the nitrogen-containing particles, the curable composition can include various optional additives. One such optional additive is a toughening agent. Toughening agents can be added to provide the desired overlap shear, peel resistance, and impact strength. Useful toughening agents are polymeric materials that may react with the epoxy resin and that may be cross-linked. Suitable toughening agents include polymeric compounds having both a rubbery phase and a thermoplastic phase or compounds which are capable of forming, with the epoxide resin, both a rubbery phase and a thermoplastic phase on curing. Polymers useful as toughening agents are preferably selected to inhibit cracking of the cured epoxy composition.

Some polymeric toughening agents that have both a rubbery phase and a thermoplastic phase are acrylic core-shell polymers wherein the core is an acrylic copolymer having a glass transition temperature below 0° C. Such core polymers may include polybutyl acrylate, polyisooctyl acrylate, polybutadiene-polystyrene in a shell comprised of an acrylic polymer having a glass transition temperature above 25° C., such as polymethylmethacrylate. Commercially available core-shell polymers include those available as a dry powder under the trade designations ACRYLOID KM 323, ACRYLOID KM 330, and PARALOID BTA 731, from Dow Chemical Co., and KANE ACE B-564 from Kaneka Corporation (Osaka, Japan). These core-shell polymers may also be available as a predispersed blend with a diglycidyl ether of bisphenol A at, for example, a ratio of 12 to 37 parts by weight of the core-shell polymer and are available under the trade designations KANE ACE (e.g., KANE ACE MX 157, KANE ACE MX 257, and KANE ACE MX 125) from Kaneka Corporation (Japan).

Another class of polymeric toughening agents that are capable of forming, with the epoxide group-containing material, a rubbery phase on curing, are carboxyl-terminated butadiene acrylonitrile compounds. Commercially available carboxyl-terminated butadiene acrylonitrile compounds include those available under the trade designations HYCAR (e.g., HYCAR 1300X8, HYCAR 1300X13, and HYCAR 1300X17) from Lubrizol Advanced Materials, Inc. (Cleveland, Ohio) and under the trade designation PARALOID (e.g., PARALOID EXL-2650) from Dow Chemical (Midland, Mich.).

Other polymeric toughening agents are graft polymers, which have both a rubbery phase and a thermoplastic phase, such as those disclosed in U.S. Pat. No. 3,496,250 (Czerwinski). These graft polymers have a rubbery backbone having grafted thereto thermoplastic polymer segments. Examples of such graft polymers include, for example, (meth)acrylate-butadiene-styrene, and acrylonitrile/butadiene-styrene polymers. The rubbery backbone is preferably prepared so as to constitute from 95 wt-% to 40 wt-% of the total graft polymer, so that the polymerized thermoplastic portion constitutes from 5 wt-% to 60 wt-% of the graft polymer.

Still other polymeric toughening agents are polyether sulfones such as those commercially available from BASF (Florham Park, N.J.) under the trade designation ULTRASON (e.g., ULTRASON E 2020 P SR MICRO).

The curable composition can additionally contain a non-reactive plasticizer to modify rheological properties. Commercially available plasticizers include those available under the trade designation BENZOFLEX 131 from Eastman Chemical (Kingsport, Tenn.), JAYFLEX DINA available from ExxonMobil Chemical (Houston, Tex.), and PLASTOMOLL (e.g., diisononyl adipate) from BASF (Florham Park, N.J.).

The curable composition optionally contains a flow control agent or thickener, to provide the desired rheological characteristics to the composition. Suitable flow control agents include fumed silica, such as treated fumed silica, available under the trade designation CAB-O-SIL TS 720, and untreated fumed silica available under the trade designation CAB-O-SIL M5, from Cabot Corp. (Alpharetta, Ga.).

In some embodiments, the curable composition optimally contains adhesion promoters to enhance the bond to the substrate. The specific type of adhesion promoter may vary depending upon the composition of the surface to which it will be adhered. Adhesion promoters that have been found to be particularly useful for surfaces coated with ionic type lubricants used to facilitate the drawing of metal stock during processing include, for example, dihydric phenolic compounds such as catechol and thiodiphenol.

The curable composition optionally may also contain one or more conventional additives such as fillers (e.g., aluminum powder, carbon black, glass bubbles, talc, clay, calcium carbonate, barium sulfate, titanium dioxide, silica such as fused silica, silicates, glass beads, and mica), pigments, flexibilizers, reactive diluents, non-reactive diluents, fire retardants, antistatic materials, thermally and/or electrically conductive particles, and expanding agents including, for example, chemical blowing agents such as azodicarbonamide or expandable polymeric microspheres containing a hydrocarbon liquid, such as those sold under the trade designation EXPANCEL by Expancel Inc. (Duluth, Ga.). Particulate fillers can be in the form of flakes, rods, spheres, and the like. Additives are typically added in amounts to produce the desired effect in the resulting adhesive.

The amount and type of such additives may be selected by one skilled in the art, depending on the intended end use of the composition.

EXEMPLARY EMBODIMENTS

Embodiment 1 is a curable, one-part epoxy/thiol resin composition comprising: an epoxy resin component comprising an epoxy resin having at least two epoxide groups per molecule; a thiol component comprising a polythiol compound having at least two primary thiol groups; a nitrogen-containing catalyst for the epoxy resin; and a substituted barbituric acid soluble in the one-part epoxy/thiol resin composition.

Embodiment 2 is the curable, one-part epoxy/thiol resin composition of embodiment 1 which is curable at a temperature of at least 50° C.

Embodiment 3 is the curable, one-part epoxy/thiol resin composition of embodiment 1 or 2 which is curable at a temperature of up to 80° C.

Embodiment 4 is the curable, one-part epoxy/thiol resin composition of any of the preceding embodiments wherein the epoxy resin comprises a polyglycidyl ether of a polyhydric phenol, a reaction product of a polyhydric alcohol with epichlorohydrin, an epoxidized (poly)olefinic resin, an epoxidized phenolic novolac resin, an epoxidized cresol novolac resin, a cycloaliphatic epoxy resin, a glycidyl ether ester, a polyglycidyl ester, a urethane modified epoxy resin, or a combination of two or more thereof.

Embodiment 5 is the curable, one-part epoxy/thiol resin composition of any of the preceding embodiments wherein the epoxy component further comprises a reactive diluent.

Embodiment 6 is the curable, one-part epoxy/thiol resin composition of embodiment 5 wherein the reactive diluent has a viscosity of less than 250 mPa·s (cPs).

Embodiment 7 is the curable, one-part epoxy/thiol resin composition of embodiment 5 or 6 wherein the reactive diluent is a monofunctional epoxy resin.

Embodiment 8 is the curable, one-part epoxy/thiol resin composition of embodiment 7 wherein the monofunctional epoxy resin comprises a (C6-C28)alkyl group.

Embodiment 9 is the curable, one-part epoxy/thiol resin composition of embodiment 8 wherein the monofunctional epoxy resin comprises (C6-C28)alkyl glycidyl ethers, (C6-C28)fatty acid glycidyl esters, (C6-C28)alkylphenol glycidyl ethers, or combinations thereof.

Embodiment 10 is the curable, one-part epoxy/thiol resin composition of any of the preceding embodiments wherein the epoxy resin component is present in an amount of at least 20 wt-%, at least 25 wt-%, at least 30 wt-%, at least 35 wt-%, at least 40 wt-%, or at least 45 wt-%, based on the total weight of the curable epoxy/thiol resin composition.

Embodiment 11 is the curable, one-part epoxy/thiol resin composition of any of the preceding embodiments wherein the epoxy resin component is present in an amount of up to 80 w-%, up to 75 wt-%, or up to 70 wt-%, based on the total weight of the curable epoxy/thiol resin composition.

Embodiment 12 is the curable, one-part epoxy/thiol resin composition of any of the preceding embodiments wherein the polythiol compound comprises trimethylolpropane tris (beta-mercaptopropionate), trimethylolpropane tris(thioglycolate), pentaerythritol tetrakis(thioglycolate), pentaerythritol tetrakis(beta-mercaptopropionate), dipentaerythritol poly (beta-mercaptopropionate), ethylene glycol bis(beta-mercaptopropionate), a (C1-C12)alkyl polythiol, a (C6-C12) aromatic polythiol, or a combination of two or more thereof.

Embodiment 13 is the curable, one-part epoxy/thiol resin composition of any of the preceding embodiments wherein the thiol component is present in an amount of at least 25 wt-%, at least 30 wt-%, or at least 35 wt-%, thiol component, based on a total weight of the curable epoxy/thiol resin composition.

Embodiment 14 is the curable, one-part epoxy/thiol resin composition of any of the preceding embodiments wherein the thiol component is present in an amount of up to 70 wt-%, up to 65 wt-%, up to 60 wt-%, up to 55 wt-%, up to 50 wt-%, up to 45 wt-%, or up to 40 wt-%, thiol component, based on a total weight of the curable epoxy/thiol resin composition.

Embodiment 15 is the curable, one-part epoxy/thiol resin composition of any of the preceding embodiments wherein the epoxy component and the thiol component are present in a ratio of from 0.5:1 to 1.5:1, or 0.75:1 to 1.3:1 (epoxy:thiol equivalents).

Embodiment 16 is the curable, one-part epoxy/thiol resin composition of any of the preceding embodiments wherein the nitrogen-containing catalyst is solid at room temperature.

Embodiment 17 is the curable, one-part epoxy/thiol resin composition of any of the preceding embodiments wherein the nitrogen-containing catalyst is capable of activation at temperatures at or above 50° C. to effect the thermal curing of the epoxy resin.

Embodiment 18 is the curable, one-part epoxy/thiol resin composition of any of the preceding embodiments wherein the nitrogen-containing catalyst is an amine-containing catalyst.

Embodiment 19 is the curable, one-part epoxy/thiol resin composition of embodiment 18 wherein the amine-containing catalyst has at least two groups of formula —NR$^2$H, wherein R$^2$ is selected from hydrogen, alkyl, aryl, alkaryl, or aralkyl.

Embodiment 20 is the curable, one-part epoxy/thiol resin composition of embodiment 19 wherein the amine-containing catalyst comprises a reaction product of phthalic anhydride and an aliphatic polyamine.

Embodiment 21 is the curable, one-part epoxy/thiol resin composition of embodiment 19 wherein the amine-containing catalyst comprises a reaction product of: (i) a polyfunctional epoxy compound; (ii) an imidazole compound, such as 2-ethyl-4-methylimidazole; and (iii) phthalic anhydride.

Embodiment 22 is the curable, one-part epoxy/thiol resin composition of embodiment 19 wherein the amine-containing catalyst comprises a reaction product of a compound having one or more isocyanate groups in its molecule with a compound having at least one primary or secondary amino group in its molecule.

Embodiment 23 is the curable, one-part epoxy/thiol resin composition of embodiment 19 wherein the amine-containing catalyst comprises 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, or a combination thereof.

Embodiment 24 is the curable, one-part epoxy/thiol resin composition of embodiment 19 wherein the amine-containing catalyst comprises products of triazine with isocyanuric acid, succinohydrazide, adipohydrazide, isophtholohydrazide, o-oxybenzohydrazide, salicylohydrazide, or a combination thereof.

Embodiment 25 is the curable, one-part epoxy/thiol resin composition of any of the preceding embodiments wherein the amine-containing catalyst is present in the curable epoxy/thiol composition in an amount of at least 1 part, at least 2 parts, at least 3 parts, at least 4 parts, or at least 5 parts, per 100 parts of the epoxy resin component.

Embodiment 26 is the curable, one-part epoxy/thiol resin composition of any of the preceding embodiments wherein the amine-containing catalyst is present in the curable epoxy/thiol resin composition in an amount of up to 45 parts, up to 40 parts, up to 35 parts, up to 30 parts, up to 25 parts, or up to 20 parts, per 100 parts of the epoxy resin component.

Embodiment 27 is the curable, one-part epoxy/thiol resin composition of any of the preceding embodiments wherein the barbituric acid derivative is a barbituric acid compound substituted at one or more of the 1, 3, and/or 5 N positions with an aliphatic, cycloaliphatic, or aromatic group.

Embodiment 28 is the curable, one-part epoxy/thiol resin composition of embodiment 27 wherein the barbituric acid derivative is of the Formula (II):

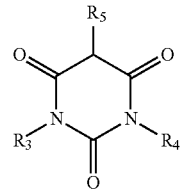

wherein one or more of the R$^3$, R$^4$, and R$^5$ groups are represented by hydrogen, an aliphatic group, a cycloaliphatic group, or an aromatic group (e.g., phenyl), optionally further substituted in any position with one or more of (C1-C4)alkyl, —OH, halide (F, Br, Cl, I), phenyl, (C1-C4) alkylphenyl, (C1-C4)alkenylphenyl, nitro, or —OR$^6$ where R$^6$ is phenyl, a carboxylic group, a carbonyl group, or an aromatic group and R$^6$ is optionally substituted with (C1-C4)alkyl, —OH, or halide; and further wherein at least one of the R$^3$, R$^4$, and R$^5$ groups is not hydrogen. In certain embodiments, at least two of the R$^3$, R$^4$, and R$^5$ groups are not hydrogen.

Embodiment 29 is curable, one-part epoxy/thiol resin composition of embodiment 28 wherein the barbituric acid derivative is selected from 1-benzyl-5-phenylbarbituric acid, 1-cycloheyl-5-ethylbarbituric acid, 1,3-dimethylbarbituric acid, and a combination thereof.

Embodiment 30 is the curable, one-part epoxy/thiol resin composition of any of the preceding embodiments wherein the barbituric acid derivative is present in the curable epoxy/thiol resin composition in an amount of at least 0.01 wt-%, based on the total weight of the epoxy/thiol resin composition.

Embodiment 31 is the curable, one-part epoxy/thiol resin composition of any of the preceding embodiments wherein the barbituric acid derivative is present in the curable epoxy/thiol resin compositions in an amount of up to 1 wt-%, based on the total weight of the epoxy/thiol resin composition.

Embodiment 32 is the curable, one-part epoxy/thiol resin composition of any of the preceding embodiments which is stable at room temperature for a period of at least 2 weeks, at least 4 weeks, or at least 2 months.

Embodiment 33 is a method of curing a curable, one-part epoxy/thiol resin composition, the method comprising: providing a curable, one-part epoxy/thiol resin composition comprising: an epoxy resin component comprising an epoxy resin having at least two epoxide groups per molecule; a thiol component comprising a polythiol compound having at least two primary thiol groups; a nitrogen-containing catalyst for the epoxy resin; and a substituted barbituric acid soluble in the one-part epoxy/thiol resin composition; and heating the curable, one-part epoxy/thiol resin composition to a temperature of at least 50° C.

Embodiment 34 is the method of embodiment 33 comprising heating the curable, one-part epoxy/thiol resin composition to a temperature of up to 80° C.

Embodiment 35 is the method of embodiment 34 comprising heating the curable, one-part epoxy/thiol resin composition to a temperature of 60-65° C.

Examples

Materials
The materials used in the following non-limiting examples are referred to as follows:

| Designation | Description |
| --- | --- |
| Epon 828 | A difunctional bis-phenol A/epichlorohydrin derived liquid epoxy resin having an equivalent weight of 185-192 grams/equivalent, available under the trade designation EPON 828 from Hexion Inc, Columbus, OH. |
| TMPMP | A multifunctional thiol, trimethylolpropane tris(3-mercaptopropionate), available under the trade designation THIOCURE TMPMP from Evans Chematics, Waterloo, NY. |
| P-2070 | An epoxy curing agent, available under the trade designation CUREDUCT P-2070 from Shikoku Chemical Corporation, Marugame, Kagawa Prefecture, Japan. |
| Omyacarb 5-FL | Calcium carbonate filler with a median diameter of 6.3 micrometers, available under the trade designation OMYACARB 5-FL from Omya, Inc, Cincinnati, OH. |
| H18 | A synthetic, hydrophobic fumed silica, available under the trade designation HDK H18 from Wacker Chemie AG, Munchen, Germany. |
| 1,3-dimethylbarbituric acid | A substituted barbituric acid derivative having a molecular weight of 156.1, commercially available from Alfa Aesar, Tewksbury, MA. |
| l-cyclohexyl-5-ethylbarbituric acid | A substituted barbituric acid derivative having a molecular weight of 238.6, commercially available from Chemische Fabrik Berg GmbH, Bitterfeld-Wolfen, Germany. |
| 1-benzyl-5-phenylbarbituric acid | A substituted barbituric acid derivative having a molecular weight of 294.3, commercially available from Chemische Fabrik Berg GmbH, Bitterfeld-Wolfen, Germany. |
| Barbituric acid | Unsubstituted barbituric acid, commercially available from Sigma Aldrich, St. Louis, MO. |

Test Methods
Shelf Life

Shelf life of uncured compositions was determined by means of viscosity measurements. The viscosity of the curable filled epoxy resin was measured by a shear rate sweep using an Ares G2 Rheometer (commercially available from TA Instruments, New Castle, Del.) in the cone and plate mode of operation. The measurements were taken at 25° C. (77° F.) using a 25 millimeters (mm) diameter stainless steel cone with a cone angle of 0.099 radians and a 50 mm plate. Two to three grams of curable resin composition were placed between the cone and plate. The cone and plate were then closed to provide a 0.465 mm gap (at the tip) filled with resin. Excess resin was scraped off the edges with a spatula. Viscosity was measured using a shear rate sweep from 20 to 0.1 Hertz and the viscosity change over time at 4.1 Hertz was monitored. Measurements were made every two to three days, during which time the samples were stored at 23-25° C. (73-79° F.). The test was discontinued if the viscosity reached a value that was double that of the initial value measured. This time was designated as the shelf life of the compositions.

Stabilizer Solubility

Stabilizer solubility was evaluated by means of optical transmission and clarity using a BYK GARDNER HAZE-GARD PLUS (BYK Gardner, Silver Spring, Md.). The instrument was referenced against air during the measurements. For transmission and clarity measurements of the uncured resins, a Teflon spacer was mounted between two clean glass microscope slides, having an average thickness of 0.039 inch (0.99 mm), such that the spacer was outside the optical measurement area and created a gap of approximately 0.072 inch (1.83 mm) into which individual samples of stabilizer-containing resins were placed. Clamps, also mounted outside the measurement area, were used to hold the glass pieces tightly to the spacer and ensure that the gap spacing was restricted to the thickness of the spacer. Five individual measurements of the transmission, haze, and clarity were taken on each of the liquid resin samples. The average percent transmission and clarity were reported. For clarity it is desirable to have values of 80%, 85%, 90% or even 95% or higher. For transmission it is desirable to have values of 80%, 85%, or even 90% or higher.

Thermal Properties—Uncured and Cured Resin Compositions

Differential scanning calorimetry (DSC) was performed using a Model Q2000 DSC (available from TA Instruments, New Castle, Del.) and evaluated using the TA Universal Analysis Software Package. A sample of uncured resin weighing between 4 and 20 milligrams was placed in an aluminum pan, weighed, and sealed. The sample was then heated at a rate of 5° C./minute from 0° C. to 250° C., followed by cooling at 20° C./minute down to −50° C., then reheating at a rate of 5° C./minute back up to 250° C. In this manner the cure onset temperature, cure peak temperature, and heat of cure energy of the uncured resins were determined during the first heat cycle; and glass transition temperature (Tg) of the cured resins was determined during the second heat cycle. The Tg was taken as the inflection point of the thermal transition.

Cure Time

Cure times of uncured resin compositions were evaluated by rapidly heating a sample to 65° C. and holding at that temperature for one hour using the same DSC equipment, software, and sample size as described for the measurement of thermal properties above. The cure time was taken as the time it took for the heat flow due to exotherm to return to 0.01 Watt/gram.

Stabilizer Solubility Evaluation

Examples 1-3 and Comparative Examples 1 and 2 (CE 1 and CE 2)

Examples 1-3 and Comparative Examples 1 and 2 were prepared using the materials and amounts (in parts by weight) shown in Table 1 and the following procedure. The materials were added to a MAX 60 SPEEDMIXER cup (Flacktek Incorporated, Landrum, S.C.) and mixed at 2,250 revolutions per minute (rpm) for 30 seconds using a DAC 600 FVZ SPEEDMIXER (FlackTek Incorporated, Landrum, S.C.), followed by heating for 20 seconds in a 1,000 Watt commercial microwave oven. Next, the sample was remixed in the DAC 600 FVZ SPEEDMIXER for two minutes at 2,250 rpm, and degassed using a DAC 600.2 VAC-P SPEEDMIXER (FlackTek Incorporated, Landrum, S.C.). The degassing cycle was as follows: 1) mix sample for 20 seconds at 1,000 rpm at atmospheric pressure; 2) mix sample for two minutes at 1,500 rpm while drawing a vacuum down to a final pressure of 30 Torr; and 3) mix sample for 20 seconds at 1,000 rpm while venting to atmospheric pressure. The resulting sample was evaluated for transmittance and clarity as described in the "Stabilizer Solubility" test method above. The results are shown in Table 1 below. In addition the samples were evaluated by unaided eye for the presence of insoluble material.

TABLE 1

Resin Compositions and Stabilizer Stability

| Material | Example 1 | Example 2 | Example 3 | CE 1 | CE 2 | Control |
|---|---|---|---|---|---|---|
| EPON 828 | 47.5 | 47.5 | 47.5 | 47.5 | 50 | none |
| TMPMP | 47.5 | 47.5 | 47.5 | 47.5 | 50 | none |
| 1,3-Dimethyl-barbituric acid | 5 | None | none | none | none | none |
| 1-Cyclohexyl-5-ethyl-barbituric acid | none | 5 | none | none | none | none |
| 1-Benzyl-5-phenyl-barbituric acid | none | None | 5 | none | none | none |
| Barbituric acid | none | none | none | 5 | none | none |
| Transmission (%) | 91.7 | 92.5 | 92.3 | 39.0 | 92.4 | 86.0 |
| Clarity (%) | 99.7 | 99.7 | 99.6 | 69.7 | 99.7 | 99.7 |
| Visible Insoluble Material | No | No | No | Yes | No | NA |

* Control was a measurement of the two glass plates with TEFLON spacer between them.
NA: Not applicable High transmission and clarity values are indicative of a homogeneous solution with no insoluble components. The results in Table 1 indicate the substituted barbituric acid derivatives were soluble in the resin compositions shown at levels as high as 5 wt %. In comparison, the unsubstituted barbituric acid sample exhibited significantly lower transmission and clarity, in addition to containing visibly insoluble material.

Adhesive Compositions

Premixes 1-3

Premixes 1-3 were prepared using the materials and amounts (in parts by weight) shown in Table 2 and the following procedure. The materials were added to a MAX 60 SPEEDMIXER cup (FlackTek, Incorporated, Landrum, S.C.) and heated for 20 seconds in a 1,000 Watt commercial microwave oven, followed by mixing at 2,300 rpm for two minutes using a DAC 600 FVZ SPEEDMIXER (FlackTek, Incorporated, Landrum, S.C.). The resulting solution was evaluated for clarity, as determined by the presence of undissolved material, by unaided eye after various times. The results are shown in Table 2.

TABLE 2

Premix Compositions

| Material | Premix 1 | Premix 2 | Premix 3 |
|---|---|---|---|
| EPON 828 | 95 | 95 | 95 |
| 1,3-dimethylbarbituric acid | 5 | none | none |
| 1-cyclohexyl-5-ethylbarbituric acid | none | 5 | none |
| 1-benzyl-5-phenylbarbituric acid | none | none | 5 |
| Clarity of Final Solution At 25° C. Immediately After Mixing | Clear | Clear | Clear |

TABLE 2-continued

Premix Compositions

| Material | Premix 1 | Premix 2 | Premix 3 |
|---|---|---|---|
| Clarity of Final Solution At 25° C. 1 Month After Mixing | Clear | Clear | Clear |
| Clarity of Final Solution After 24 Hours at −23° C. | Clear | Clear | Clear |

Examples 4-8 and Comparative Example 3 (CE 3)

Examples 4-8 and Comparative Example 3 were prepared using the materials and amounts (in parts by weight) shown in Table 3, except for P-2070, to a MAX 60 SPEEDMIXER cup and mixing at 1,500 rpm for one minute using a DAC 600 FVZ SPEEDMIXER. To each of these mixtures was then added P-2070 followed by mixing again at 1,500 rpm for one minute to obtain uncured epoxy resin compositions.

TABLE 3

Uncured Epoxy Resin Compositions

| Component | Example 4 | Example 5 | Example 6 | Example 7 | Example 8 | CE 3 |
|---|---|---|---|---|---|---|
| EPON 828 | 32.6 | 31.9 | 31.3 | 28.7 | 32.7 | 34.0 |
| P-2070 | 5.4 | 5.4 | 5.4 | 5.4 | 5.4 | 5.4 |
| TMPMP | 23.7 | 23.7 | 23.7 | 23.7 | 23.7 | 23.7 |
| Omyacarb 5-FL | 34.9 | 34.9 | 34.9 | 34.9 | 34.9 | 34.9 |
| H18 | 2.0 | 2.0 | 2.0 | 2.0 | 2.0 | 2.0 |
| Premix 1 | 1.4 | none | none | none | none | none |

TABLE 3-continued

| | Uncured Epoxy Resin Compositions | | | | | |
|---|---|---|---|---|---|---|
| Component | Example 4 | Example 5 | Example 6 | Example 7 | Example 8 | CE 3 |
| Premix 2 | none | 2.1 | none | none | none | none |
| Premix 3 | none | none | 2.7 | 5.3 | 1.3 | none |

The uncured epoxy resin compositions shown in Table 3 were then evaluated for shelf life, cure properties, and Tg. The results are shown in Table 4.

When three different barbituric acid derivatives were used in equimolar amounts (Examples 4-6) they all exhibited a much longer shelf life relative to Comparative Example 3, while still providing short cure times. Additionally, higher and lower levels of the barbituric acid derivatives may be used (Examples 7 and 8) although at higher levels the cure time increases.

TABLE 4

| | Uncured and Cured Epoxy Resin Composition Properties | | | | | |
|---|---|---|---|---|---|---|
| Property | Example 4 | Example 5 | Example 6 | Example 7 | Example 8 | CE 3 |
| Shelf Life | 35 days | ca. 17 days | >75 days | >75 days | >75 days | <1 day |
| Cure Time at 65° C. (minutes) | 6 | 6 | 7 | 38 | 7 | 6 |
| Cure Onset Temperature (° C.) | 67 | 69 | 70 | 80 | 72 | 66 |
| Cure Peak Temperature (° C.) | 74 | 75 | 77 | 86 | 79 | 74 |
| Heat of Cure (Joules/gram) | 258 | 242 | 246 | 263 | 261 | 255 |
| Tg (° C.) | 38 | 37 | 39 | 42 | 43 | 39 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:

1. A curable, one-part epoxy/thiol resin composition comprising:
    an epoxy resin component comprising an epoxy resin having at least two epoxide groups per molecule;
    a thiol component comprising a polythiol compound having at least two primary thiol groups;
    a nitrogen-containing catalyst for the epoxy resin; and
    a substituted barbituric acid soluble in the curable, one-part epoxy/thiol resin composition, wherein soluble means that when the substituted barbituric acid is incorporated in the curable, one-part epoxy/thiol resin composition in an amount of five weight percent, the curable, one-part epoxy/thiol resin composition has at least 80% clarity, at least 80% transmission, or both at least 80% clarity and at least 80% transmission.

2. The curable, one-part epoxy/thiol resin composition of claim 1 which is curable at a temperature of at least 50° C.

3. The curable, one-part epoxy/thiol resin composition of claim 1 wherein the epoxy resin comprises a polyglycidyl ether of a polyhydric phenol, a reaction product of a polyhydric alcohol with epichlorohydrin, an epoxidized polyolefinic resin, an epoxidized phenolic novolac resin, an epoxidized cresol novolac resin, a cycloaliphatic epoxy resin, a glycidyl ether ester, a polyglycidyl ester, a urethane modified epoxy resin, or a combination of two or more thereof.

4. The curable, one-part epoxy/thiol resin composition of claim 1 wherein the epoxy component further comprises a reactive diluent.

5. The curable, one-part epoxy/thiol resin composition of claim 1 wherein the epoxy resin component is present in an amount of 20 wt % to 80 wt %, based on the total weight of the epoxy/thiol resin composition.

6. The curable, one-part epoxy/thiol resin composition of claim 1 wherein the polythiol compound comprises trimethylolpropane tris(beta-mercaptopropionate), trimethylolpropane tris(thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), a C1-C12 alkyl polythiol, a C6-C12 aromatic polythiol, or a combination of two or more thereof.

7. The curable, one-part epoxy/thiol resin composition of claim 1 wherein the thiol component is present in an amount of 25 wt % to 70 wt %, based on a total weight of the curable, one-part epoxy/thiol resin composition.

8. The curable, one-part epoxy/thiol resin composition of claim 1 wherein the epoxy component and the thiol component are present such that a ratio of epoxy:thiol equivalents is in a range from 0.5:1 to 1.5:1.

9. The curable, one-part epoxy/thiol resin composition of claim 1 wherein the nitrogen-containing catalyst is solid at room temperature.

10. The curable, one-part epoxy/thiol resin composition of claim 1 wherein the nitrogen-containing catalyst is capable of activation at temperatures at or above 50° C. to effect the thermal curing of the epoxy resin component.

11. The curable, one-part epoxy/thiol resin composition of claim 1 wherein the nitrogen-containing catalyst is an amine-containing catalyst.

12. The curable, one-part epoxy/thiol resin composition of claim 11 wherein the amine-containing catalyst is present in the curable, one-part epoxy/thiol composition in an amount of 1 part to 45 parts per 100 parts of the epoxy resin component.

13. The curable, one-part epoxy/thiol resin composition of claim 1 wherein the substituted barbituric acid is a barbituric acid compound substituted at one or more of the 1, 3, or 5 N positions with an aliphatic, cycloaliphatic, or aromatic group.

14. The curable, one-part epoxy/thiol resin composition of claim 13 wherein the substituted barbituric acid is of the Formula:

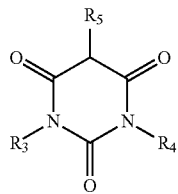

wherein one or more of the $R^3$, $R^4$, and $R^5$ groups are represented by hydrogen, an aliphatic group, a cycloaliphatic group, or an aromatic group, optionally further substituted in any position with one or more of C1-C4 alkyl, —OH, halide, phenyl, C1-C4 alkylphenyl, C1-C4 alkenylphenyl, nitro, or —OR$^6$ where R$^6$ is phenyl, a carboxylic group, a carbonyl group, or an aromatic group and R$^6$ is optionally substituted with C1-C4 alkyl, —OH, or halide; and further wherein at least one of the $R^3$, $R^4$, and $R^5$ groups is not hydrogen.

15. The curable, one-part epoxy/thiol resin composition of claim 14 wherein the substituted barbituric acid is selected from 1-benzyl-5-phenylbarbituric acid, 1-cyclohexyl-5-ethylbarbituric, 1,3 -dimethylbarbituric acid, and a combination thereof.

16. The curable, one-part epoxy/thiol resin composition of claim 1 wherein the substituted barbituric acid is present in the curable, one part epoxy/thiol resin composition in an amount of 0.01 wt % to 1 wt %, based on the total weight of the curable, one-part epoxy/thiol resin composition.

17. The curable, one-part epoxy/thiol resin composition of claim 1 which is stable at room temperature for a period of at least 2 weeks.

18. A method of curing the curable, one-part epoxy/thiol resin composition, the method comprises:
providing the curable, one-part epoxy/thiol resin composition of claim 1 and
heating the curable, one-part epoxy/thiol resin composition to a temperature of at least 50° C.

19. The method of claim 18 comprising heating the curable, one-part epoxy/thiol resin composition to a temperature of up to 80° C.

20. The method of claim 19 comprising heating the curable, one-part epoxy/thiol resin composition to a temperature of 60-65° C.

* * * * *